March 24, 1953  J. L. KAS  2,632,444
PELLET INJECTOR
Filed June 14, 1951

Inventor
John L. Kas
by Wright, Brown,
Quinby & May Attys.

Patented Mar. 24, 1953

2,632,444

UNITED STATES PATENT OFFICE 2,632,444

PELLET INJECTOR

John Leo Kas, Boston, Mass.

Application June 14, 1951, Serial No. 231,628

4 Claims. (Cl. 128—217)

This invention relates to an improved device for injecting pellets under the skin of animals such as cattle or fowl. An object of the invention is to provide a convenient injector which can readily be held and operated by one hand of the operator and which can carry a large number of pellets. The injector includes a hollow needle with a plunger slidable therein to eject pellets therefrom one by one. The plunger is operated by a spring which is compressed when the plunger is retracted to a cocked position. A trigger is provided to release the plunger from its cocked position and allow the compressed spring to project it forward to eject from the needle the pellet which is moved into line with the plunger by the trigger itself. The trigger also actuates a feeding disk which transfers pellets one by one to the trigger from a magazine capable of holding a large supply of pellets.

For a more complete understanding of the invention, reference may be had to the following description thereof and to the drawing, of which—

Figure 6:
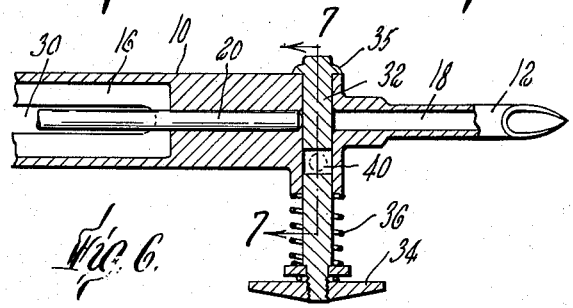
Figure 6 is a section on the line 6—6 of Figure 1.
Figure 8:
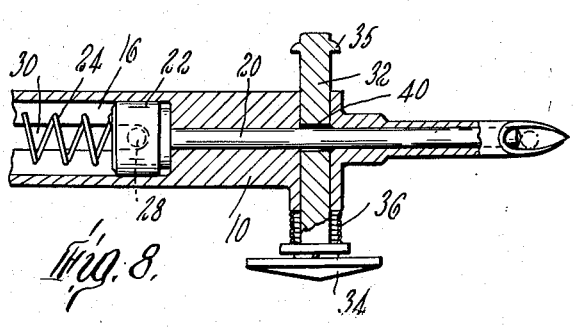
Figure 8 is a section similar to Figure 6 but with the parts in a different position of operation.
Figure 7:
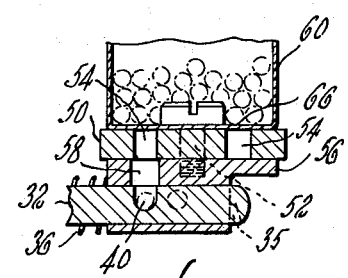
Figure 7 is a section on the line 7—7 of Figure 6.

The device illustrated on the drawing for injecting pellets under the skin of an animal comprises a body member or barrel 10 which is intended to be held in an approximately horizontal position when in use. A hollow needle 12 projects from the forward end of the barrel 10 and a suitable grip or handle 14 may be mounted on the rear end portion of the barrel. The barrel has a large bore 16 extending forward from the rear end thereof and communicating with a coaxial bore 18 of smaller diameter which extends to the extremity of the needle 12. Slidable in the smaller bore 18 is a plunger 20 which is adapted to move forward until the extremity thereof is in the position shown in Figure 8, that is, substantially at the forward end of the needle 12. The plunger 20 is provided with a head 22 at the rear end thereof adapted to bring up against the forward end of the large bore 16 when the forward end of the plunger has reached the position shown in Figure 8. A spring 24 is compressed between the head 22 and a plug 26, the latter being secured in the rear end of the barrel as by being screw threaded therein. This spring 24 constantly tends to push the plunger 20 to its projected position. In order to facilitate retracting the plunger to the cocked position, a finger piece 28 may be secured to the head 22 so as to project radially therefrom through a longitudinal slot 30 in the barrel 10. When the device is held in the hand of the operator which grips the handle 14, the forefinger of the same hand may conveniently be used to retract the plunger 20 to the cocked position indicated in Figure 6. A trigger is provided to block the forward movement of the plunger from its cocked position until the trigger is actuated to release the plunger. The trigger comprises a bar 32 slidable in a bore which extends transversely through the forward end portion of the barrel 10 and intersects the bore 18. On one end of the trigger bar 32 is mounted a finger button 34. At the other end is a stop element 35. Between the finger button and the barrel 10 is a compressed spring 36 which constantly presses the trigger bar to the extended position shown in Figure 6 with the stop element 35 engaging the side of the barrel 10. The bar 32 is provided with a notch 40 which is about the same size as the bore 18 and is adapted to be moved into registry with that bore when the bar is pushed against the spring 36 to the position shown in Figure 8. When the trigger bar is in its projected position, as shown in Figure 6, the bar acts as a stop to block forward movement of the plunger 20 from its cocked position. When the finger button 34 is pressed to push the bar in until the notch 40 registers with the bore 18, the plunger is released and is thereupon projected forward by the compressed spring 24. As hereinafter described, mechanism is provided for supplying a pellet to the notch 40 when the bar is in its projected position. When the bar is pushed in to release the plunger, the pellet is moved into line with the plunger so that when the plunger is projected forward, it pushes the pellet ahead of it and thus implants the pellet under the skin of the animal which has previously been punctured by the sharp end of the needle.

Figures 3, 4, 5:
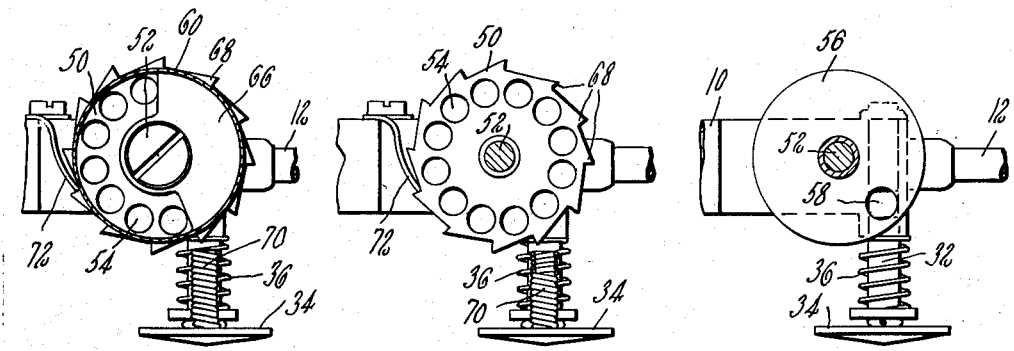
Figure 3 is a section on the line 3—3 of Figure 1.
Figure 4 is a section on the line 4—4 of Figure 1.
Figure 5 is a section on the line 5—5 of Figure 1.

Means for feeding pellets one by one into the notch 40 for transfer to the bore 18 may comprise a feeding disk 50 which is mounted on top of the forward end of the barrel 10 and is rotatable about a pin or bolt 52 which is secured to the barrel near its forward end. The disk 50 is provided with a circular series of perforations 54 through its marginal portion, each perforation being of a size to accommodate a single pellet. Underlying the disk 50 is a fixed circular floor 56 which may be integral with the barrel 10. The floor 56 is provided with a single perforation 58 which is located directly above the notch 40 in the trigger bar 32 when the latter is in the extended position illustrated in Figures 5 and 6. A considerable supply of pellets may be maintained on the disk 50 by a magazine consisting of a cylindrical wall 60 and a cover 62, the disk itself serving as the bottom of the magazine. The cover 62 may be held on by any suitable means such as a bolt 64 which permits the cover to be swung laterally to open the top of the magazine for insertion of pellets. Integral with the wall 60 is a bottom sector 66 which is secured by the bolt 52 and which supports the wall 60 and the cover 62. This bottom member covers a portion of the disk 50 including the perforation 54 which is immediately over the notch 40, but leaves exposed a considerable number of the perforations 54 as indicated in Figure 3 to receive pellets from the magazine. When the instrument is held in the proper position for use the magazine will be above the disk 50 and pellets therein will enter the successive perforations 54 as these perforations move out from under the bottom member 66.

Figures 1, 2:
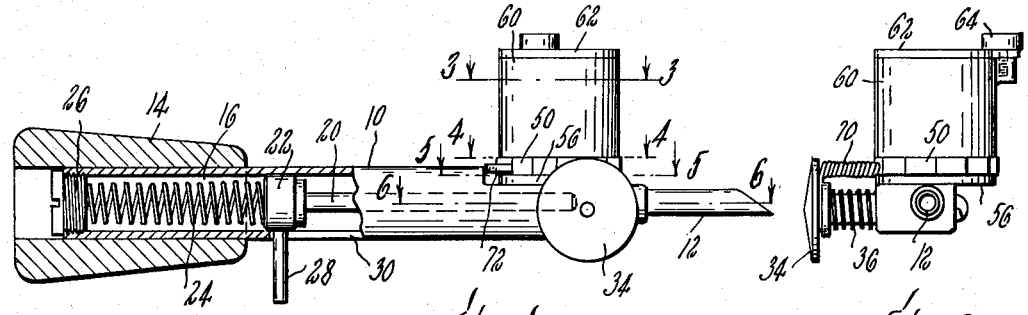
Figure 1 is a side elevation of a device embodying the invention, a portion being broken away to show in section.
Figure 2 is a front elevation of the same.

Automatic means operated by reciprocation of the trigger bar 32 rotate the disk 50 step by step so as to bring successive perforations 54 into registration with the notch 40. For this purpose, the periphery of the disk 50 is provided with ratchet teeth 68 which are adapted to be engaged in succession by a flexible pawl 70 as shown in Figures 2, 3, and 4. This pawl may be in the form of a tightly coiled spring, one end of which is secured to the finger button 34, the other end being free to engage the nearest tooth 68 of the ratchet wheel. A stationary pawl 72 is mounted on the barrel 10 to prevent reverse movement of the disk 50.

To operate the device, the plunger is restricted to its cocked position by pulling the fingerpiece 28, preferably with the forefinger of the hand in which the instrument is held. When the plunger reaches its cocked position, the trigger bar will be pushed to its extended position by the compressed spring 36, in which position the bar blocks forward movement of the plunger and thus holds it in its cocked position. When the bar is in its extended position, the notch 40 is immediately below the hole 58 so that it receives a pellet from the hole. When the needle has been inserted through the skin of the animal, the finger button 34 is pressed by the forefinger of the operator to push the bar inward until the notch 40 comes into registry with the bore 18, moving the pellet which it has received from the disk into a position directly in front of the plunger 20. The plunger, being thus released is pushed forward by the spring 24, ejecting the pellet ahead of it from the forward end of the needle. During this inward movement of the bar 32, the flexible pawl 70 engages one of the teeth 68 and rotates the disk 50 sufficiently to bring the next successive perforation 54 immediately above the hole 58, and the pellet in this perforation thereupon falls into the hole. When the bar 32 is next moved by the spring 36 to its projected position as shown in Figure 6, the notch 40 moves into a position immediately below the hole 58 and thus receives therefrom the pellet therein. Thus by automatically pressing against the fingerpiece 28 and then the bar 34, the device can be cocked and the plunger released, a fresh pellet being moved into place in front of the plunger each time it is released. The magazine 60 may be made in any convenient size, the one illustrated on the drawing being adapted to hold 400 to 500 pellets. These pellets are fed one by one into the needle 12 each time the plunger is actuated so that the device can be used for a large number of operations without stopping to replenish the magazine or feeding disk.

I claim:

1. A pellet injecting device comprising a hollow needle, a plunger slidable in said needle to the forward end thereof, spring means pressing said plunger forward, means on said plunger engageable to retract the plunger against the pressure of the spring to a cocked position, a stop element movable into a position to retain the plunger in its cocked position and into a second position to release said plunger, said stop element having means for moving a pellet into line with said plunger when said stop element is moved to release the plunger, a magazine for a supply of pellets normally above the level of the needle when the device is in use, and means operable by actuation of said stop element to receive pellets one by one from said magazine and to transfer the received pellets to said stop element.

2. A pellet injecting device as in claim 1, said receiving and transferring means comprising a disk with a series of perforations in the margin thereof to receive single pellets, and ratchet means for imparting step-by-step rotation to the disk when the stop element is operated.

3. A pellet injecting device comprising an elongated body member, a hollow needle projecting from an end of said member, said member and needle having a bore therethrough, a plunger slidable in said bore from a retracted position to a forward position in which its forward end is substantially at the extremity of the needle, spring means in said body member pressing said plunger forward, a fingerpiece carried by said plunger and projecting laterally from said body member for manual retraction of said plunger, a trigger member extending transversely through said body member across said bore at the forward extremity of the plunger when the plunger is retracted to block forward movement of the plunger, said trigger having a transverse recess therein movable into line with said bore to release said plunger for forward movement, a magazine carried by said body member, a feeding disk rotatably mounted on said body member to transfer pellets one by one from the magazine to said trigger recess, and ratchet means operated by reciprocation of the trigger to impart step-by-step feeding rotation to said disk.

4. A pellet injecting device comprising a horizontal barrel with a longitudinal slot, a hollow needle projecting from an end of said barrel, a plunger in said barrel having a portion slidable in said needle to the end thereof, spring means in said barrel pressing said plunger forward, a fingerpiece projecting down from said plunger and through said slot, said fingerpiece being engageable to retract said plunger to a cocked position, a trigger means comprising a transversely slidable bar extending through said barrel at the forward end thereof to block forward movement of the plunger from its cocked position, said bar having a recess therein adapted to receive a pellet and to be moved into line with said plunger whereby to release the plunger for forward movement from its cocked position, a container for a supply of pellets mounted on the forward portion of said barrel, the bottom member of said container being a horizontal rotatable feeding disk having a series of perforations through its margin to receive single pellets, a fixed floor member mounted on said barrel and underlying some of said perforations, one said perforation being directly over the recess in said bar when the bar is in its plunger-blocking position, and ratchet means for imparting step-by-step rotation to said disk when said bar is moved to its plunger-releasing position to move successive perforations into position to deliver a pellet into said recess.

JOHN LEO KAS.

REFERENCES CITED

The following references are of record in the file of this patent:

UNITED STATES PATENTS

| Number | Name | Date |
|---|---|---|
| 842,631 | Deperdussin | Jan. 29, 1907 |
| 1,109,072 | Kozmousky | Sept. 1, 1914 |
| 1,347,622 | Deininger | July 27, 1920 |